United States Patent [19]

Kinzenbaw

[11] 4,117,893
[45] Oct. 3, 1978

[54] AGRICULTURAL TOOL BAR

[76] Inventor: Jon Eugene Kinzenbaw, P.O. Box 525, Williamsburg, Iowa 52361

[21] Appl. No.: 831,744

[22] Filed: Sep. 9, 1977

Related U.S. Application Data

[63] Continuation of Ser. No. 644,547, Dec. 29, 1975, abandoned.

[51] Int. Cl.$^2$ .............................................. A01B 73/00
[52] U.S. Cl. .................................. 172/311; 172/174; 280/656; 172/421; 172/397; 111/85
[58] Field of Search ............... 172/311, 456, 174, 421, 172/397

[56] References Cited

U.S. PATENT DOCUMENTS

| | | | |
|---|---|---|---|
| 3,414,064 | 12/1968 | Foster | 172/311 |
| 3,491,836 | 1/1970 | Doepker | 172/311 |
| 3,548,954 | 12/1970 | Lindemann | 172/311 |
| 3,654,999 | 4/1972 | Fischer | 172/311 |
| 3,791,673 | 2/1974 | Hornung | 172/311 |
| 3,944,001 | 3/1976 | Warner et al. | 172/311 |
| 3,982,773 | 9/1976 | Stufflebeam et al. | 172/456 |

*Primary Examiner*—George J. Marlo
*Attorney, Agent, or Firm*—Emrich, Root, O'Keeffe & Lee

[57] ABSTRACT

An agricultural tool bar includes a main frame adapted to be drawn by a traction vehicle. First and second tool support beams are pivotally mounted to the main frame. The tool support beams are adapted for movement between a use position and a road travel position. In the use position, the axes of the tool support beams are collinear and extend transverse of the direction of travel of the vehicle, and in the travel position, they are folded rearwardly. An articulated link is provided for each tool support bar, selectively holding it either in the use position or the folded position. The main frame and tool support beams may be raised relative to the ground so that the tool support bars do not have to be rotated about horizontal axes prior to folding.

9 Claims, 6 Drawing Figures

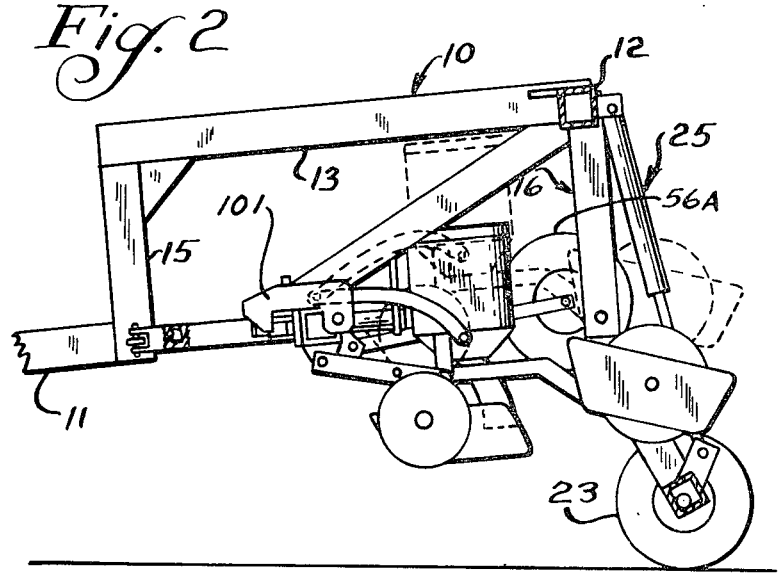

AGRICULTURAL TOOL BAR

This is a continuation, of application Ser. No. 644,547, filed Dec. 29, 1975, now abandoned.

BACKGROUND AND SUMMARY

This invention relates to an argricultural tool bar which is adapted to be pulled by a traction vehicle; and more particularly, it relates to a tool bar which is capable of being folded to the rear for road travel.

Typically, a tool bar of the type with which the present invention is concerned carries a number of individual implements, such as seed planters, chisel plows, ammonia knives, or other ground-working tools or devices. As used herein, "tool bar" refers to the overall apparatus or system, and a "tool support beam" is the horizontal member which extends transversely of the direction of travel of the vehicle in the use position and on which the individual devices are mounted.

In the illustrated embodiment, the devices mounted on the tool support beam are corn planters, so reference will be made throughout to such planters. However, persons skilled in the art will readily appreciate that many other individual devices may be readily incorporated into the present invention.

There has been a tendency in modern tractors to incorporate greater and greater power into the prime mover, resulting in increased drawbar pull. This can be accounted for, at least in part, by modern farming techniques which require deeper plowing of the soil. At any rate, with the power available, there has been a desire to incorporate greater numbers of planters, for example, on a tool bar. Realizing that the planters are spaced at row intervals, the width of such tool bars during use is substantial. For example, planters are available which are capable of simultaneously planting twelve 30-inch rows. The overall width of such a device is approximately 30 feet. The advantages of planting or cultivating twelve rows at a time are obvious. However, one commercial embodiment of a twelve-row planter has a rigid one-piece tool support beam, and it requires a separate trailer for transport over the road. The tool bar is loaded sideways onto the trailer. The time required for loading, unloading and connection at the planting site, together with the added expense of the separate long trailer, offsets many of the advantages of the wide tool bar.

In one commercial cultivator capable of cultivating eight rows of 30-inch spacing (again, too wide for road travel), the tool support beam is a rigid one-piece construction having a hitch at one end and a pair of support wheels at the other end so that the tool bar may be pulled lengthwise for road travel. Again, it is required that the farmer disconnect the use position of the tool bar from the tractor and re-connect the end hitch for road travel.

Folding tool bars have been suggested and are available. In one commercial embodiment, a cultivator capable of working twelve rows is divided into two side sections, one located on either side of the tractor body. The cultivator is specially mounted at the forward end of the tractor and for road travel, the two cultivator wings are folded forward, so that the outboard ends of the tool support beams in the use position are in front of the tractor and linked together in the road travel position.

Another folding tool bar which is available commercially has a rigid center section connected to the rear of a tractor and two outboard portions or wings which fold vertically by means of hydraulic cylinders which may be housed in the center beam, if desired. In this device, the width of the system in the folded position is not substantially less than it is in the extended or use position because even though the tool support beams are folded, they are folded in such a manner that the implements mounted to the beams extend outwardly in the folded position—thereby adding their height to the width of the apparatus in the travel position. Further, tool bars which fold vertically are undesirable for use with planters or liquid applicators because the seed boxes and chemicals with the planting units must be emptied to avoid spilling or leaking of the contents and to reduce the weight of the units to avoid bending damage.

A rear-mounted, forward-folding tool bar is disclosed in U.S. Pat. No. 3,491,836. In this patent, the three sections of the tool bar must be rotated so that the devices carried thereby extend vertically in the travel position (as contrasted to horizontally in the use position) prior to folding.

Rear-folding tool bars have also been suggested, although none are known to me which are capable of accommodating seed planters which do not have to be emptied in order to place the tool bar in the travel position. For example, one such rear-folding tool bar is disclosed in U.S. Pat. No. 3,548,954, but this device, like that disclosed in the previously-mentioned patent, requires that the various sections of the tool support beam be rotated about a common horizontal axis prior to folding so that the implements carried by it extend vertically. Other patents of interest include three U.S. Pat. Nos. 3,502,154, 3,637,027, and 3,774,693.

The present invention concerns an agricultural tool bar which includes a main frame adapted to be drawn by a traction vehicle. The main frame is independently supported by wheels, and it may be raised by means of a hydraulic cylinder and piston rod unit. The main frame includes a base member and cross frame member rigidly connected. Thus, in the illustrated embodiment, the main frame has a general T-shape with the cross frame member extending transverse of the direction of travel of the vehicle and the base of the T-shape being located generally along the center line of the system. The center line, of course, extends in the direction of travel of the vehicle.

First and second tool support beams extend laterally of the main frame and carry implements such as seed planters, chisel plows or the like. The inboard ends of the tool support beams in the illustrated embodiment are located adjacent each other in the use position, and the axes of these beams are collinear and extend transverse of the direction of travel of the vehicle.

A pair of side frame members connects the tool support beams respectively to the outboard ends of the cross frame member of the main frame for pivotal motion about respective vertical axes. Preferably, the cross frame member of the main frame is located at a higher elevation than the tool support beams. Thus, these side frame members just mentioned extend from the tool support beams upwardly and rearwardly to the outboard ends of the cross frame member. The tool support beams may be folded with their outboard ends being pivoted rearwardly about the connection of the side frame member to the cross frame member. In the folded position, the axes of the tool support beams extend parallel to the direction of travel of the vehicle, and the implements carried by the tool support beams are located within the perimeter of the beams in the folded position.

A pair of articulated links are provided, one for each tool support beam. The forward end of each articulated link is connected to the main frame at a forward position thereof, and the rear end of each link is connected to an intermediate position on the associated tool support beam. Each link includes a bending section or elbow. In the use position, the articulated links are folded, and the elbow of each link is secured to the associated tool support beam at a location outboard of the pivot location for the tool support beam. Thus, the tool support beam is stabilized in the extended or use position. When the tool support beam is folded rearwardly, the articulated link is extended, and the elbow is connected to the inboard end of the tool support beam to hold it in the folded position.

Each tool support beam may be provided with caster wheels at their outboard ends for support in the folded position. In the use position, additional support wheels may be provided, and these two sets of wheels may be raised and lowered hydraulically by the operator without leaving his position in the seat of the tractor.

In operation, the apparatus of the present invention is simple. To fold the tool support beams for road travel, the operator raises the main frame by actuating a first hydraulic cylinder and piston rod unit. He then lowers the caster wheels while raising the other support wheels for each tool support beam. At the same time, any row markers provided on the outboard ends of the tool support beams are raised. This may all be done with controls located adjacent the operator's position and without having to move from that position. The operator then unlatches the elbows of the articulated links and simply drives forward a short distance. The outboard ends of the tool support beams, supported now by the caster wheels, are free to move rearwardly and do so until the apparatus assumes the travel position, at which time, the elbows of the articulated links latch to the inboard ends of the tool support bars which are now located in forward positions. The apparatus is thus set up for road travel, all of the implements having been raised, but not tilted or otherwise turned, by raising the main frame and by lowering the caster wheels.

In order to set up the apparatus for use at the working site, the operator simply reverses the procedure just mentioned—that is, first he unlatches the elbows of the articulated links from the inboard or forward ends of the tool support bars, and he then drives the tractor in reverse circling first to one side and then to the other until the two side tool support beams are latched in the use position. The planters may then be lowered for planting by raising the caster wheels and by lowering the main frame.

It will thus be appreciated that the present invention provides a tool bar system which readily folds between the use position and the travel position. Further, because of the structure, the tool support beams may be extended to cover a large number of rows. For example, the present invention could readily be extended to have an overall width (in the use position) of 75 feet or more, and yet be folded to the travel position having an overall width of about 16 feet, and thus easily pulled along a highway.

Further, it will be appreciated that folding of the tool bar may be accomplished with a minimum of effort by the operator and in a very short time, but with a little experience. Folding does not require that the tool support beams or the implements carried by it be twisted or turned in any manner so the apparatus is suitable for use with many different types of tools, devices or implements.

Other features and advantages will be apparent to persons skilled in the art from the following detailed description of a preferred embodiment accompanied by the attached drawing wherein identical reference numerals will refer to like parts in the various views.

The Drawing

FIG. 1 is a fragmentary plan view of apparatus incorporating the present invention;

FIGS. 2 and 3 are cross sectional views taken through the section line 2—2 of FIG. 1 showing the main frame respectively raised and lowered;

DETAILED DESCRIPTION

Figure 4:
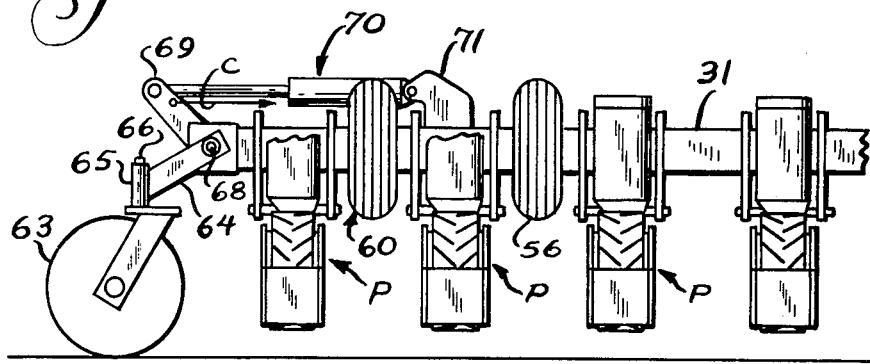
FIGS. 4 and 5 are fragmentary rear views of the outboard end of a tool support beam of the apparatus of FIG. 1 in the raised and lowered positions respectively.

Referring first to FIGS. 1, 2 and 3, reference numeral 10 generally designates a main frame which is adapted to be pulled by a traction vehicle connected to a forward tongue or draft member 11 by means of a conventional hitch (not shown). The main frame 10 includes a cross frame member or beam 12, a forwardly-extending base frame member 13 extending forwardly of the center of the cross frame member 12 and rigidly connected to it, and a vertical forward frame member 15 (see FIGS. 2 and 3).

Extending downwardly from either side of the cross frame member are first and second articulated legs 16, 17. The articulated leg 16 includes an upper member 18 and a lower member 19 pivotally connected together at 20. The upper portion of the upper member 18 is welded to the underside of the cross frame member 12, and the lower portion of the lower member 19 is welded to an axle 22 which is supported by wheels 23. The articulated leg 17 is similar to leg 16, but it interconnects the other side of the cross frame member 12 with the axle housing 22. A hydraulic cylinder and piston rod unit generally designated 25 has its rod and pivotally connected at 26 to the axle housing 22, and its cylindrical end pivotally connected at 27 to the center of the cross frame member 12.

Comparing FIGS. 2 and 3, the main frame 10 may be raised when the hydraulic unit 25 is expanded (FIG. 2) and lowered when it is contracted (FIG. 3). The controls for the hydraulic unit 25 are preferably located on the tractor adjacent the operator's position so that he can raise or lower the main frame without leaving his position on the tractor.

Referring particularly now to FIG. 1, first and second tool support beams are designated respectively 30 and 31. The beam 30 has an inboard end 32, and the inboard end of the beam 31 is designated 33. As seen in FIG. 1 in solid line, the left side tool support beam is arranged in the use position—that is, it extends transverse of the direction of travel of the vehicle, and the right side tool support beam is seen in the folded or road travel position—that is, it extends parallel to the direction of travel of the vehicle.

The beam 31 is shown in dashed line in FIG. 1 in the use position, and when the tool support beams 30, 31 are both in the use position, their inboard ends 32, 33 are located adjacent the center line of the apparatus which, in the illustrated embodiment, is located in the same vertical plane as the axis of the base frame member 13. It will be observed that the base frame member 13 and the cross frame member 12 form a generally T-shape as seen in FIG. 1. Further, the base frame member 13 and the forward vertical frame member 15 could be replaced by a single member which would extend upwardly and rearwardly from the rear end of the tongue 11 to the center portion of the cross beam 12, if desired.

The tool support beams 30, 31 are similar and symmetrical about the center line of the system, so that only one need be described in further detail for a complete understanding of the invention. Referring then to the right side tool support beam 31, it is connected to the outboard right side of the cross frame member 12 by means of a side frame member 35 which extends rearwardly and upwardly from its pivotal connection 37 to the tool support beam 31 (see the corresponding side frame member 35A in FIG. 3 which connects the left side tool support bar 30 to the other side of the cross frame member 12).

The connection between the cross frame member 12 and the side frame members 35, 35A are pivotal connections, and they are designated respectively 38 and 39. It is these pivotal connections which permit the folding of the tool support beams 30, 31, the two positions for the right side tool support beam 31 being shown respectively in dashed line and in solid line, as explained above.

Figure 6:
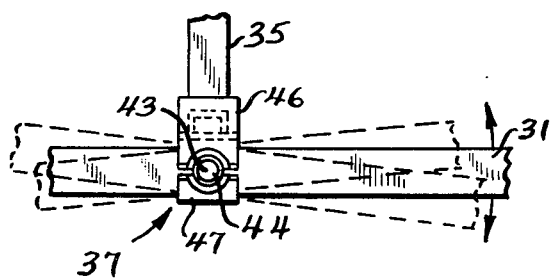
FIG. 6 is a fragmentary close-up view showing a mounting of a tool support beam for rotation to conform to the contour of the ground.

Referring now to FIG. 6, the lower pivotal connection between the side frame member 35 and the horizontal tool support beam 31 is shown. This pivotal connection permits the tool support beam 31 to rotate about a horizontal axis parallel to the direction of travel of the vehicle, and indicated by the dashed line 43 in FIG. 1. This permits the seed planter units, designated P, to follow the contour of the ground as it is traversed. The beam 31 is provided with a stub shaft 44 which acts as a pivot pin and is held by upper and lower members forming a bearing and designated 46, 47 in FIG. 6. Referring now to the planter units P, they are of conventional design and commercially available. Each unit includes a seed box 50 which is held by a forward parallel linkage generally designated 51 to the associated tool support bar, and a packing wheel 52 which follows the planter mechanism and seed box 50 to bury the seed after planting. The mounting linkage 51 permits the unit to be pulled by the associated tool support bar while accommodating itself individually to variations in ground contour. In other words, the unit is supported by the wheel 52 which determines the height of the planter. There is a depth below which the planting units P cannot descend when the tool support bar 31 is raised and this permits the planting units also to be raised when the associated tool support bar is raised sufficiently, as will be discussed. This limit occurs when the upper side links of the linkage 51 are engaged by and held against the top of the associated tool support beam.

It will be observed that in FIG. 1, the central portion of the right side tool support beam 31 has been cut away, but that the planters P are normally spaced at equal distances. In this embodiment, there are seven planters P on each tool support beam. Between the fifth and sixth planters P there is a first support wheel 56 which is mounted by a linkage 57 to the tool support beam 31. A hydraulic cylinder and piston rod unit 58 is connected at its cylinder end to the beam 31 and at its rod end to a brace 59 of the linkage 57. A similar wheel support generally designated 60 is provided between the sixth and seventh planter units for the same beam 31, and it is actuated by a hydraulic cylinder and piston rod unit 61. The hydraulic units 58, 61 are operated in unison, again by controls located adjacent the operator's station on the traction vehicle. The wheels 56, 60 are employed when the tool support beams are in the extended or use position (see FIG. 5) and they are raised after an end caster wheel 63 is lowered to support the weight of the tool support beam and planter units (see FIG. 4). The caster wheel 63 is mounted to a crank 64 which holds a bearing sleeve 65 receiving a shaft 66 permitting the wheel 63 to freely rotate about the axis of the shaft. The crank 64 is rigidly connected by means of a pin 68 to an arm 69. The arm 69 is pivotally connected to the rod end of a cylinder and piston rod unit 70, the cylinder end of which is pivotally connected to a bracket 71 located on top of the tool support beam 31. A cable C is also connected at one end to the arm 69 (see FIG. 4) and the cable extends along the tool support beam 31 and is partially wound around a sheave 72 which is pivotally mounted to the beam 31 at an inclination, as illustrated. The other end of the cable C is secured to a cross bar 73 connected to the supporting linkage 51 of the second planter unit P2 from the center on the right side tool support bar 31.

Figure 5:
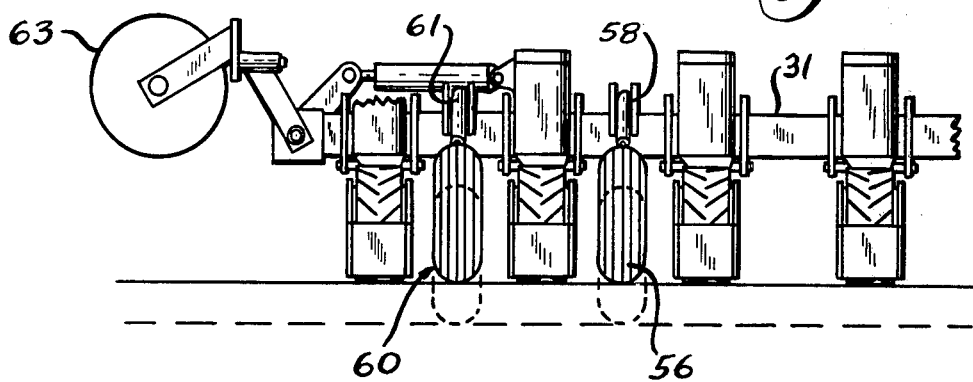

When the hydraulic unit 70 is expanded, it rotates the caster wheel 63 into the supporting position shown in FIG. 4, and at the same time draws the cable C toward the outboard end of the tool support beam 31, thereby lifting the planter unit P2 to a height sufficient to clear the support wheel 23 for the main frame 10.

A row marker of conventional design, the arm of which is shown at the upper portion of FIG. 1 and designated 80 may be provided at the outboard end of the tool support beam 31 for marking the distance between previously planted rows and the ones currently being planted. However, this forms no part of the present invention, and need not be described any further.

Referring back to FIG. 1, a pair of articulated links generally designated respectively 90 and 90A are interconnected between the forward portion of the main frame 10 and the tool support beams 30, 31 respectively. Specifically, the articulated link 90 includes a first link 92, the forward portion of which is pivotally connected at 93 to a flange 94 located at the base of the vertical frame member 15 (see FIG. 3) of the main frame 10. A second or rear link 95 is pivotally connected at 96 to the rear end of the forward link 92, and its other end is pivotally connected at 98 to a trunnion bracket 91 welded to the forward surface of the tool support beam 31. A bracket 99 is provided between the link 95 and the pivotal connection 96 to the link 92, and a catch or tongue 100 is welded to the top of the bracket 99.

A first latch member 101 is pivotally mounted at 102 to the inborad end of the tool support beam 31, and a similar bracket 103 is pivotally mounted at an intermediate location which is equally distant from, but on the other side of the pivot pin 98. Corresponding elements are numbered for the articulated bracket 90 on the left side of the system, but those reference numerals are followed by an A.

Still referring to FIG. 1, the articulated link 90A is shown in a folded position in which the latch 103A engages and holds the catch member 100A. In this position, the link 92A is connected to the tool support bar 30 at a position (namely the location of latch 103A) which is spaced laterally beyond the pivot 39 for the left side tool support bar 30. Thus, the tool support bar 30 in this position is firmly held extended so that the planter units P may be used for planting. If desired, the bracket 99A may be locked by means of a bolt 105A, although it is not necessary.

In the extended position, as illustrated by the solid line showing of the articulated link 90, the catch member 100 is secured by the latch 101 located at the inboard end of the tool support bar 31, and in this position, the tool support bar 31 is held in a folded position.

In order to fold the tool bar for road travel, first the main frame 10 is raised (FIG. 2) by extending the hydraulic unit 25 from the operator's position, after having released the latches 101 and 101A. Next, the caster wheel 63 is lowered by extending the hydraulic unit 70. This also raises the planter unit P2 by means of the cable C. Next, the use support wheels 56, 60 are raised (see wheel 56A in FIG. 2). The system is then pulled forward and it is free to pivot about the vertical stub shaft 38 in the direction of the arrow 110. When it has reached the fully folded position, the latch 101 engages the catch member 100 to hold the tool support bar in the folded position. The tool support beam on the other side may be folded in a similar manner. Both tool support beams may be folded simultaneously, if desired, although it may be necessary to swing the tractor to the side to achieve a fully folded position, depending upon the terrain.

To extend the tool support bars for use, the procedure is reversed. First, the inboard latches 101, 101A are released, and the tractor is driven backward, preferably in a circular motion opposite to the intended direction of rotation of the side frame members 35, 35A. Hence, it is preferred that when extending the tool support beams for use, only one be opened at a time. When the tool support beam has reached a fully-opened position, the latches 103, 103A will engage the associated catch member on the articulated link, and the system will be ready for use.

The raising of the second planter unit P2 (and the corresponding unit on the other side) is necessary only because, for the particular row setting desired, it would otherwise interfere with the support wheel 23 for the main frame. Similarly, the particular location of the side frame members 35, 35A is not critical. These members are in the position shown because of the desired row-to-row spacing of the planter units and a desire to have the side frame members 35, 35A located between adjacent planter units.

Because of the length of the planter units, the location of the pivot connections 38, 39 of the tool support beams 31, 30 respectively to the main frame 10, and in particular, to the cross frame member 12 is considered to be an important feature of the present invention. It will be observed from FIGS. 2 and 3 that this pivot location is raised above the normal use height of the tool support beams. Further, the distance between the center line of the system and the pivot location (indicated by arrow 118 in FIG. 1) plus the distance between that pivot location and the axis of the associated tool support beam 31 (indicated by arrow 119) is greater than the length of the planter units. This relationship enables the planter units to be swung outwardly during the folding motion, and this avoids interference between the units and enables each side to operate independently of the other.

At the same time, in the use position, the location of the pivots 38, 39 enables all units to be equally spaced, including the inboard units on each tool support beam. By having these pivot locations to the side of the center line, the distance that the tool support beam is located in front of the pivot point in the use position is shortened, and, at the same time, the side frame members 35, 35A are located laterally of the center line in the use position which reduces the stress on these members during use.

The relationships just discussed are advantageous, as mentioned, because of the length of the planter units. If the planter units are shortened to less than the 7 feet of the better ones now available commercially, or if other, shorter tools are being used, the pivot locations 38, 39 of the tool beams to the main frame may be moved closer toward the center of the system. For example, if the tool or planter units are less than about 5 feet long, the pivot locations 38, 39 may be moved adjacent one another and in line with the inboard ends of the tool beams. This would further permit lowering the pivot locations so that the inclined beams 35, 35A could assume a more generally horizontal position.

Another important feature of the illustrated embodiment is the articulated links and the functions they perform of locking the tool beams in either the extended use position or the folded travel position. An alternative construction for each side would be a single forward link such as that designated 92 which would have a sleeve collar at its rear end. The collar may be received in a guide rod or bar located on the tool beam, and the collar would be slidable along the guide bar between the two positions required for use and road travel. A latch could be included for securing the collar at either position.

It will be observed that the present invention provides for a folding tool bar which, in the folded position has a constant width, irrespective of the number of units on the tool support beams. In the illustrated embodiment, the corresponding planter units on either tool support beam are aligned laterally in the folded position, but this is not necessary for they may be staggered or interlaced, if desired. It will further be observed that folding is accomplished without the need to disconnect the main frame from the traction vehicle and without having to rotate the tool support beams 30, 31 about their axes. Because power of the tractor assists in folding, it is not necessary the two or more men be available to assist in folding or unfolding the tool bar.

Have thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An agricultural tool bar comprising: a main frame having a forwardly extending draft member adapted to be pulled by a traction vehicle, said frame further providing first and second pivotal mounting locations; first and second support beams; means for mounting said first and second support beams respectively to said first and second mounting locations for pivotal motion about respective vertical axes to permit each support beam to be rotated between a use position in which said beam extends outwardly and transverse of the direction of travel of said vehicle, and road travel positions in which said beam extends rearwardly and parallel to the direction of travel of said vehicle; first and second link means, each link means including first and second rigid links pivotally connected together, one of said links being pivotally connected to said draft member at a location forward of its associated beam in the use position, and the other link being pivotally connected to its associated beam at a location outboard of the vertical rotational axis for said beam, said first and second links of each link means cooperating with each other such that when the associated beam is in the use position, one of said links extends between said draft member and an outboard location on said beam to hold said beam extended in the use position, and when said beam is in the travel position, one of said links extend between a forward location on said draft member and a forward location on its associated beam to hold said beams rearward in the travel position.

2. The apparatus of claim 1 wherein said first and second link means comprises articulated link means for each support beam, each articulated link means including a first rigid link connected at its forward end to a forward location on said main frame and a second rigid link pivotally connected at one end to the other end of said first link to form an elbow, and pivotally connected at the other end to an intermediate location on the associated tool support beam; said apparatus further comprising first latch means adjacent the inboard and of each support beam in the use position for securing said link means adjacent said elbows to the associated tool support beam in a folded position; and second latch means carried by each support beam for securing said elbows to a location on said support beam outboard of the pivotal connection of said other end of said second link to hold the associated support beam in an extended or use position.

3. The apparatus of claim 1 further comprising wheel support means for said main frame; extensible means for connecting said wheel support means to said main frame, and power means for selectively extending said link support means to raise said main frame and said implements for said travel position.

4. The apparatus of claim 1 wherein each of said support beams further includes first wheel support means selectively movable between a raised and a lowered position and adapted to support said support beam in the use position when lowered; and second wheel support means selectively positionable between a raised and a lowered position and adapted to support said support beam in the travel position when lowered.

5. An agricultural tool bar comprising: a main frame adapted to be pulled by a traction vehicle and providing first and second pivotal mounting locations; first and second support beams; means for mounting said first and second support beams to said first and second mounting locations for pivotal motion about respective vertical axes to permit said support beams to be rotated between use and road travel positions; first and second link means each connected to a location of said main frame forward of said beams when said beams are in the use position, each link means including at least one rigid link; first means for connecting each of said first and second link means to associated ones of said support beams in the use position at a first location outboard of said pivotal mounting locations to hold said support beams transverse of the direction of travel of said vehicle in said use position; and second means for connecting the rigid links of said first and second link means to associates ones of said support beams in the travel position at a second location adjacent the forward ends thereof when said beams are placed in the travel position.

6. An agricultural tool bar comprising: a main frame adapted to be pulled by a traction vehicle and providing first and second pivotal mounting locations; first and second support beams; means for mounting said first and second support beams to said first and second mounting locations for pivotal motion about respective vertical axes to permit said support beams to be rotated between use and road travel positions; first and second link means each connected to a location of said main frame forward of said beams when said beams are in the use position, each link means including at least one rigid link; first and second releasable latch means for connecting said rigid links of said first and second link means between said associated ones of said support beams at a first location outboard of said pivotal mounting locations when said beams are in the use position to hold said support beams transverse of the direction of travel of said vehicle in said use position; and second means for connecting said first and second link means to associated ones of said support beams in the travel position at a second location adjacent the forward ends thereof when said beams are placed in the travel position.

7. In an agricultural tool bar, the combination comprising: a main frame adapted to be pulled by a traction vehicle; first and second horizontally elongated support beams pivotally mounted to said main frame for selective placement either in a use position wherein said support beams extend transverse of the direction of travel of said vehicle or in a travel position wherein said support beams extend parallel to the direction of travel of said vehicle; first link means for selectively connecting said main frame to said first support beam at a location spaced laterally outward of said pivotal mounting to said main frame when said first support beam is in said use position and for selectively connecting to said first support beam at a location adjacent the forward end thereof when said first support beam is in said travel position; second link means for selectively connecting said main frame to said second support beam at a location spaced laterally outward of said pivotal mounting to said main frame when said second support beam is in said use position, and for selectively connecting to said second support beam at a location adjacent the forward end thereof when said second support beam is in said travel position; and a plurality of implements carried by each of said support beams at spaced intervals and extending to the rear thereof when said beams are in said use position, said implements being within the perimeter of said beams when said beams are in said travel position.

8. An agricultural tool bar comprising: a main frame adapted to be pulled by a traction vehicle and providing first and second pivotal mounting locations; first and second support beams; means for mounting said first and second support beams to said first and second mounting locations for pivotal motion about respective vertical axes to permit said support beams to be rotated between use and road travel positions; first and second rigid links; means for pivotally connecting one end of said first and second links to a location on said main frame forward of said beams in the use position; means connected to the other ends of said first and second links for permitting said other ends of said links to move between first and second positions on their associated beams; first means for releasably latching said other ends of said first and second links to associated ones of said support beams in the use position at a first outboard location to hold said support beams transverse of the direction of travel of said vehicle in said use position; and second means for releasably latching said other ends of said first and second link means to associated ones of said support beams in the travel position at a second location adjacent the forward ends thereof when said beams are placed in the travel position, said means connected to said other ends of said first and second links remaining connected to their associated support beams to guide said first and second links as said links are moved between use and travel positions.

9. An agricultural tool bar comprising: a main frame adapted to be pulled by a traction vehicle and providing first and second pivotal mounting locations; first and second support beams; first and second side frame members pivotally mounted at one end respectively to said first and second support beams for rotation about horizontal axes, extending perpendicular to the direction of elongation of said beams, and pivotally mounted at the other end to said main frame for pivotal motion about respective vertical axes to permit said tool support beams to be rotated between use and road travel positions; first and second link means each connected at a forward end to a forward location of said main frame; first means for connecting each of said first and second link means to associated ones of said support beams in the use position at a first outboard location to hold said support beams transverse of the direction of travel of said vehicle in said use position; and second means for connecting said first and second link means to associated one of said support beams in the travel position at a second location adjacent the forward ends thereof when said beams are placed in the travel position.

* * * * *